United States Patent
Mendoza Saldivar et al.

(10) Patent No.: US 10,173,499 B1
(45) Date of Patent: Jan. 8, 2019

(54) MECHANISM FOR SUN VISOR EXTENSION

(71) Applicant: Ford Global Technologies, LLC, Dearborn, MI (US)

(72) Inventors: Hector Alberto Mendoza Saldivar, Cuautitlan Izcalli (MX); Eduardo Arturo Aguilar Ruelas, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 15/688,219

(22) Filed: Aug. 28, 2017

(51) Int. Cl.
  *B60J 3/02* (2006.01)

(52) U.S. Cl.
  CPC .......... *B60J 3/0208* (2013.01); *B60J 3/0278* (2013.01)

(58) Field of Classification Search
  CPC ......... B60J 3/0213; B60J 3/026; B60J 3/0208
  See application file for complete search history.

(56) References Cited

U.S. PATENT DOCUMENTS

| | | | |
|---|---|---|---|
| 2,498,966 A | 2/1950 | Sauer | |
| 2,667,222 A | 1/1954 | McCarthy et al. | |
| 3,853,370 A | 12/1974 | Barnhart | |
| 4,810,023 A | 3/1989 | Kawada | |
| 5,104,174 A | 4/1992 | Gute | |
| 5,259,657 A | 11/1993 | Arendt et al. | |
| 5,301,994 A | 4/1994 | Wilson | |
| 5,316,361 A | 5/1994 | Miller | |
| 5,478,131 A | 12/1995 | Marks | |
| 5,749,618 A | 5/1998 | Jones | |
| 5,873,621 A * | 2/1999 | Kuighadush | B60J 3/0208 160/DIG. 3 |
| 6,237,964 B1 | 5/2001 | Cross | |
| 6,325,443 B1 | 12/2001 | Sanchez | |
| 6,585,308 B2 | 7/2003 | Sturt et al. | |
| 7,320,492 B1 | 1/2008 | Rosenbaum | |
| 8,246,099 B2 * | 8/2012 | Lee | B60J 3/0208 296/97.4 |
| 8,544,933 B1 | 10/2013 | Fuller | |
| 8,789,870 B1 * | 7/2014 | Tolbert | B60J 3/0208 296/97.8 |
| 9,233,598 B1 * | 1/2016 | Elwood | B60J 3/0217 |
| 9,493,055 B1 * | 11/2016 | Murat | B60J 3/0208 |
| 2016/0318378 A1 | 11/2016 | Nedelman | |

* cited by examiner

*Primary Examiner* — Pinel E Romain
(74) *Attorney, Agent, or Firm* — Vichit Chea; Price Heneveld LLP

(57) ABSTRACT

A vehicle visor includes a visor body having an inner cavity with first and second channels disposed therein. A blade is slideably mounted to the first and second channels between extended and retracted positions by first and second rails of the blade that are slideably received in the first and second channels of the visor body. An adjustment knob is mounted on the visor body and includes a toothed outer perimeter that gearingly engages a toothed track disposed on the blade within the inner cavity. The adjustment knob further includes an exposed portion that is disposed outside of the inner cavity and accessible to a user for incremental rotation resulting in deployment or retraction of the blade.

20 Claims, 7 Drawing Sheets

MECHANISM FOR SUN VISOR EXTENSION

FIELD OF THE INVENTION

The present invention generally relates to sun visors for motor vehicles, and more particularly, to sun visors including a visor blade extension mechanism and an associated deployment mechanism.

BACKGROUND OF THE INVENTION

Sun visors are often provided within vehicle interiors and are often mounted to an interior roof near the A-pillar of the vehicle on a pivoting hinge to block exterior sunlight from entering the vehicle interior. Often, sun visors do not cover enough area to sufficiently block incoming sunlight, such that incoming light can still reach a driver and impair the driver's ability to see. Some visor assemblies do not come with blade extensions or the current extension designs are very difficult to manage. Current blade extension designs can become stuck or damaged due to inconsistent deployment mechanisms that require a driver to use their entire hand to properly deploy a blade extension. Aftermarket extensions must be added to a current sun visor assembly, and can be clumsy designs that are clipped or attached to a sun visor assembly using cords or tape. An easily deployable blade extension is desired having a deployment mechanism that allows for controlled deployment of the blade extension with minimal user input.

SUMMARY OF THE INVENTION

According to one aspect of the present invention, a vehicle visor includes a visor body having an inner cavity with first and second channels disposed therein. A blade is slideably mounted to the first and second channels between extended and retracted positions. An adjustment knob is mounted on the visor body and includes a toothed outer perimeter that gearingly engages a toothed track disposed on the blade within the inner cavity. The adjustment knob further includes an exposed portion that is disposed outside of the inner cavity and accessible to a user.

Embodiments of the first aspect of the invention can include any one or a combination of the following features:
- a blade that includes first and second rails slideably received in the first and second channels of the visor body, respectively.
- a toothed track disposed on an underside of the second rail.
- an access aperture disposed through the second channel, wherein the toothed outer perimeter of the adjustment knob extends through the access aperture to engage the toothed track of the blade.
- a visor body including an outer frame having inner and outer surfaces, and further wherein the adjustment knob is rotatably coupled to the inner and outer surfaces of the outer frame in a mounting aperture that opens into the second channel of the visor body through the access aperture.
- a slot disposed between and interconnecting the first and second channels, wherein the slot includes an open front portion spaced-apart from an end wall.
- a blade that includes first and second rails and a body portion disposed therebetween, wherein the first and second rails are slideably received in the first and second channels of the visor body, respectively, and the body portion of the blade is slideably received in the slot of the visor body.
- a body portion of the blade that includes an inner edge that abuts the end wall of the slot when the blade is in the retracted position.
- a handle portion disposed on an opposite end of the blade relative to the inner edge, wherein the handle portion abuts the open front portion of the slot of the visor body when the blade is in the retracted position.

According to another aspect of the present invention, a vehicle visor includes a visor body having first and second channels disposed therein. The first and second channels include first and second cross-sectional configurations, respectively, that are different from one another. A blade includes first and second rails with a body portion disposed therebetween. The first and second rails of the blade include first and second cross-sectional configurations, respectively, that are different from one another. The first rail of the blade is slideably received within the first channel of the visor body, and the second rail of the blade is slideably received within the second channel of the visor body. Thus, the blade is operable between extended and retracted positions relative to the visor body.

Embodiments of the second aspect of the invention can include any one or a combination of the following features:
- the first cross-sectional configuration of the first channel having a rounded outer perimeter, and the first cross-sectional configuration of the first rail having a rounded outer perimeter.
- the second cross-sectional configuration having a non-round outer perimeter, and the second cross-sectional configuration of the second rail having a non-round outer perimeter.
- the first and second channels of the visor body extending inwardly into the visor body beyond the end wall of the slot, and the first and second rails extending inwardly beyond an inner edge of the body portion of the blade.

Yet, according to another aspect of the present invention, a vehicle visor includes a visor body having first and second channels disposed therein. The second channel includes an access aperture disposed therethrough. A blade is slideably mounted to the first and second channels at first and second rails of the blade. An adjustment knob is rotatably mounted to the visor body and includes a toothed outer perimeter that is gearingly engaged with a toothed track disposed on the blade through the access aperture of the second channel.

Embodiments of the third aspect of the invention can include any one or a combination of the following features:
- the visor body having inner and outer surfaces spaced-apart from one another to define an inner cavity of the visor body, and the adjustment knob engaging the toothed track within the inner cavity of the visor body.
- the adjustment knob is positioned on the visor body, such that a portion of the adjustment knob extends outwardly from the visor body.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
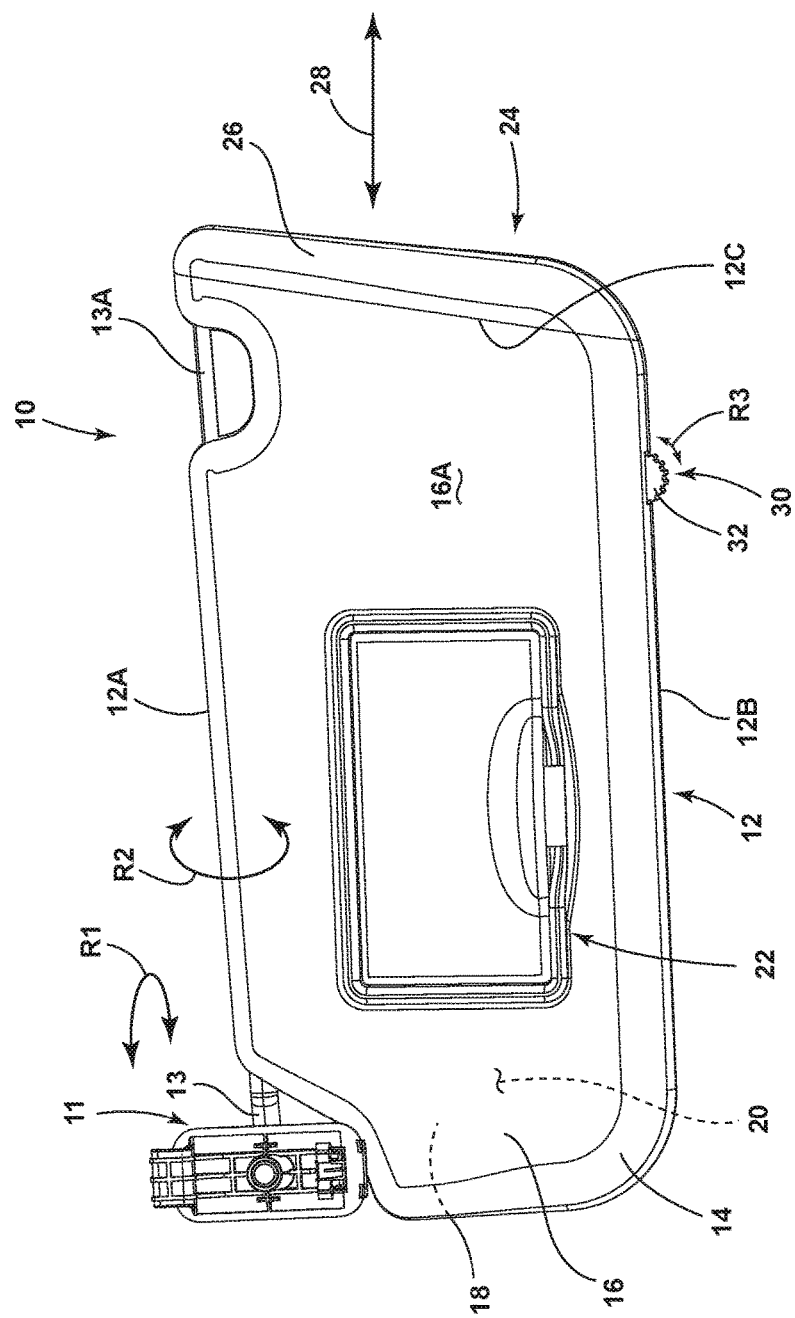
FIG. 1 is a top plan view of a vehicle visor having a blade in a retracted position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle visor 10 is shown which may be referred to herein as a visor assembly, visor, or sun visor. The visor 10 includes a visor body 12 that is configured to mount to a headliner of a vehicle near a vehicle windshield. Specifically, the visor 10 mounts to the vehicle headliner at a pivoting mounting assembly 11. The pivoting mounting assembly 11 couples to a mounting bar 13 disposed through an upper portion 12A of the visor body 12. The mounting bar 13 further includes an exposed portion 13A disposed on an opposite side of the mounting bar 13 relative to the pivoting mounting assembly 11. The exposed portion 13A of the mounting bar 13 is configured to releasably couple to a clip assembly mounted to the headliner of a vehicle, such that the visor 10 can pivot between first and second positions along a path as indicated by arrow R1. The visor 10 can also pivot on the mounting bar 13 between raised and lowered positions in a flip-down manner along the path as indicated by arrow R2. In FIG. 1, it is contemplated that the visor 10 is in a lowered position, such that the visor body 12 of the visor 10 can block incoming sunlight to shade a vehicle occupant. It is noted that the pivoting mounting assembly 11 may be disposed in a different configuration than that shown in FIG. 1 when the visor 10 is in the lowered position.

Figure 4:
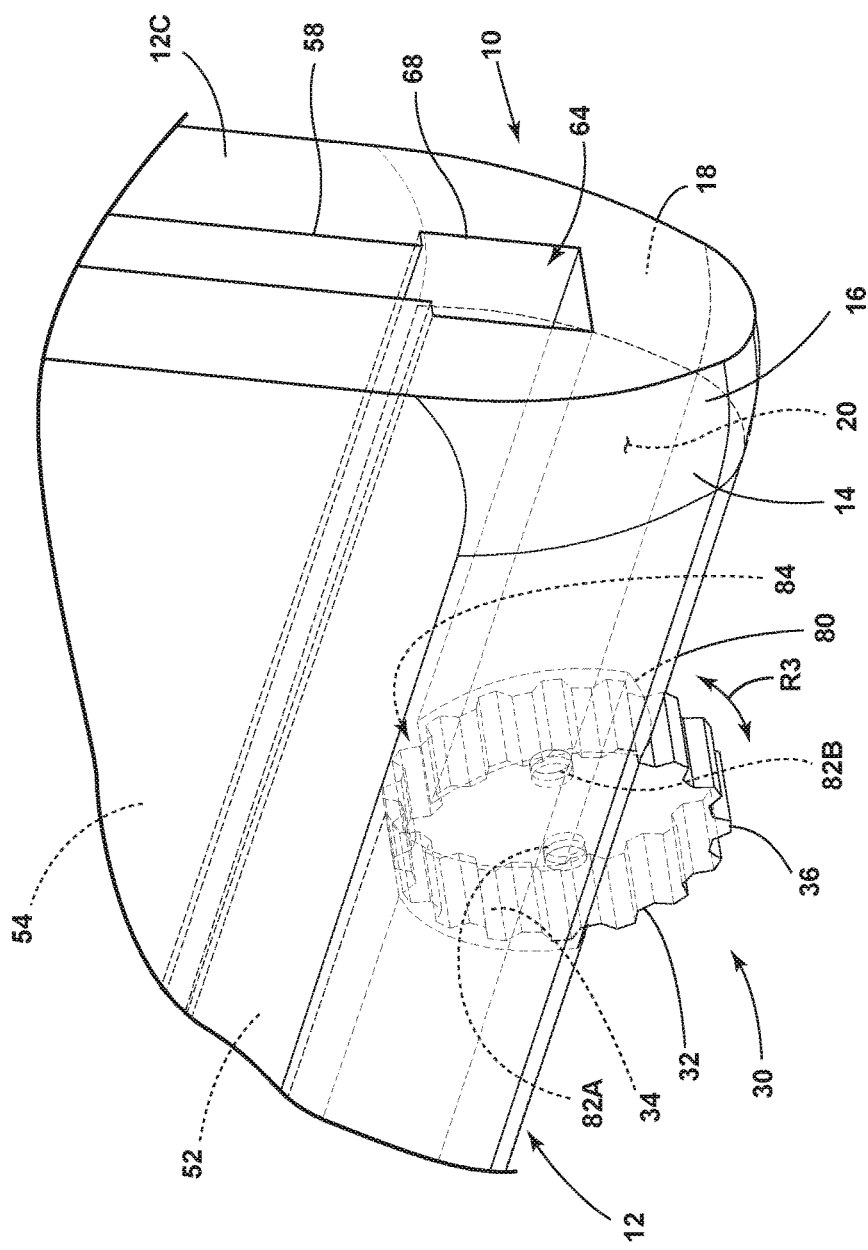
FIG. 4 is a partial top perspective view of a lower corner of the vehicle visor of FIG. 3 showing an adjustment knob mounted thereto.

In the embodiment shown in FIG. 1, the visor body 12 of the visor 10 includes an outer frame 14 and an inner panel 16. An outer panel 18 is disposed on an opposite side of the visor body 12 relative to the inner panel 16 as best shown in FIG. 4. Between the inner and outer panels 16, 18 an inner cavity 20 of the visor body 12 is disposed. In the configuration shown in FIG. 1, the visor body 12 includes the upper portion 12A and a lower portion 12B. Disposed between the upper portion 12A and the lower portion 12B of the visor body 12, the inner panel 16 includes an inner surface 16A having a flip-up mirror assembly 22 disposed thereon. The flip-up mirror assembly 22 is contemplated to be an optional accessory for the visor 10. In the embodiment shown in FIG. 1, a blade 24 is shown having a handle portion 26 which abuts an outer edge 12C of the visor body 12. The handle portion 26 of the blade 24 abuts the outer edge 12C of the visor body 12 of the visor 10 when the blade 24 is in the retracted position as shown in FIG. 1. The blade 24 is configured to move laterally in the direction as indicated by arrow 28 between the retracted position shown in FIG. 1, and an extended position shown in FIG. 2B. The blade 24 is contemplated to move to the extended position to provide greater surface area to the visor 10 for blocking an increased amount of incoming light. According to an embodiment of the present invention, the blade 24 is deployed to the extended position from the retracted position using an adjustment knob 30 that is rotatably mounted to the visor body 12 at the outer frame 14 thereof. The adjustment knob 30 is shown in FIG. 1 as having an exposed portion 32 which extends outwardly below the visor body 12, such that the adjustment knob 30 is accessible by a user for rotation along the path as indicated by arrow R3. Adjustment of the blade 24 between the retracted and extended positions using the adjustment knob 30 is further described below.

Figure 2A:
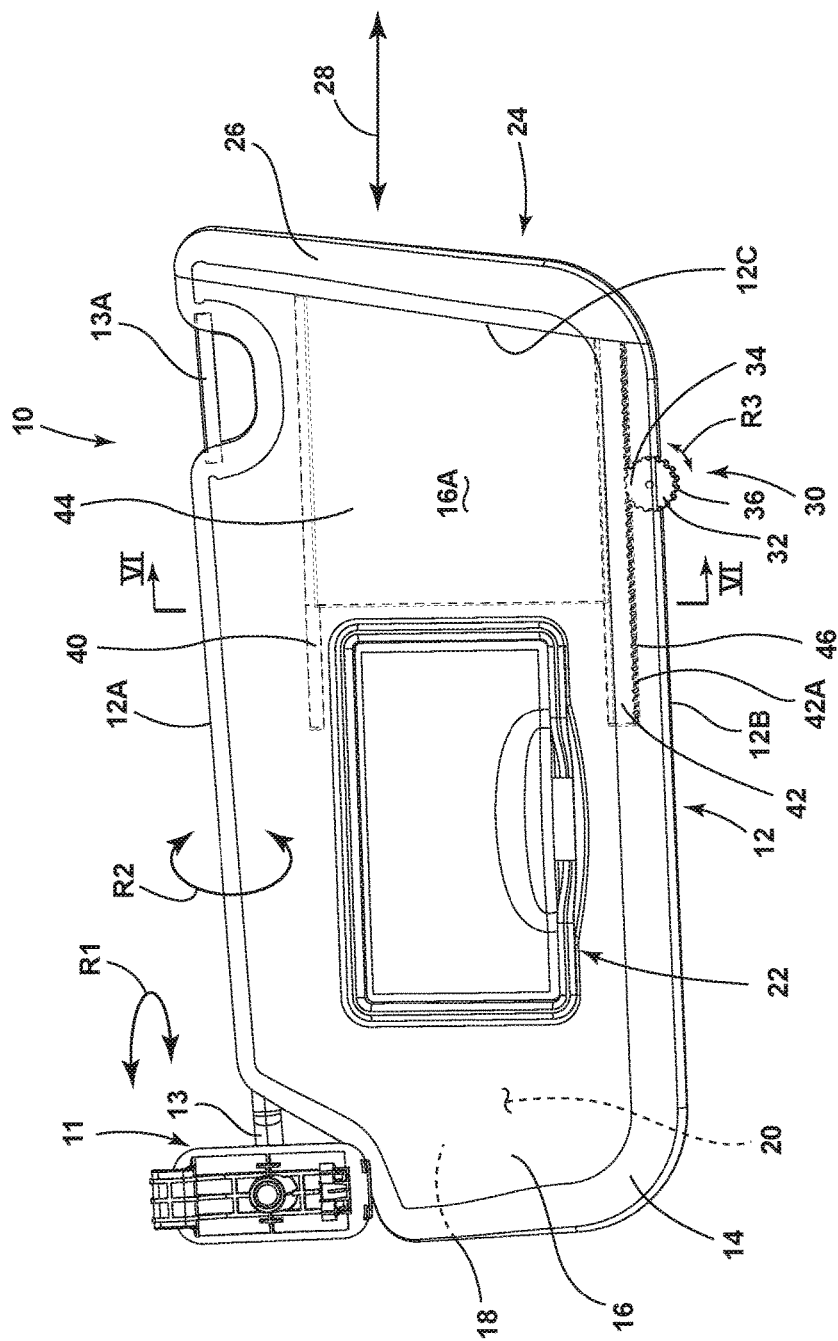
FIG. 2A is a top plan view of the vehicle visor of FIG. 1 with the blade shown in phantom within an inner cavity.

Referring now to FIG. 2A, the visor 10 is shown with the blade 24 shown primarily in phantom within the inner cavity 20 of the visor body 12. As shown in FIG. 2A, the blade 24 includes first and second rails 40, 42, which may be referred to herein as upper and lower rails 40, 42. The first and second rails 40, 42 are slideably received within channels disposed within the visor body 12, as further described below. As noted above, the blade 24 is operable between extended and retracted positions along the path as indicated by arrow 28. In FIG. 2A, the blade 24 is shown in the retracted position. As further shown in FIG. 2A, the first and second rails 40, 42 are spaced-apart with an interconnecting body portion 44 disposed therebetween. The body portion 44 of the blade 24 provides for increased sun blocking surface area for the visor 10 when the blade 24 is in the extended or deployed position. As further shown in FIG. 2A, the blade 24 includes a toothed track 46 which, in the embodiment of FIG. 2A, is disposed on an underside 42A of the second rail 42. The toothed track 46 is configured to gearingly engage a toothed outer perimeter 36 of the adjustment knob 30 at an upper engagement portion 34 of the adjustment knob 30 that is disposed within the inner cavity 20 of the visor body 12. Thus, as shown in FIG. 2A the adjustment knob 30 includes the exposed lower portion 32 and the concealed upper engagement portion 34, such that a user can engage the adjustment knob 30 at the exposed portion 32 to rotate the adjustment knob 30 in the direction as indicated by arrow R3 to deploy or retract the blade 24 given the gearing engagement of the adjustment knob 30 with the toothed track 46 of the blade 24. While the toothed track 46 is shown disposed on the underside 42A of the second rail 42, it is contemplated that the toothed track 46 may be disposed on any portion of the blade 24, wherein the toothed track 46 is in contact with the toothed outer perimeter 36 of the adjustment knob 30 for lateral movement of the blade 24.

Figure 2B:
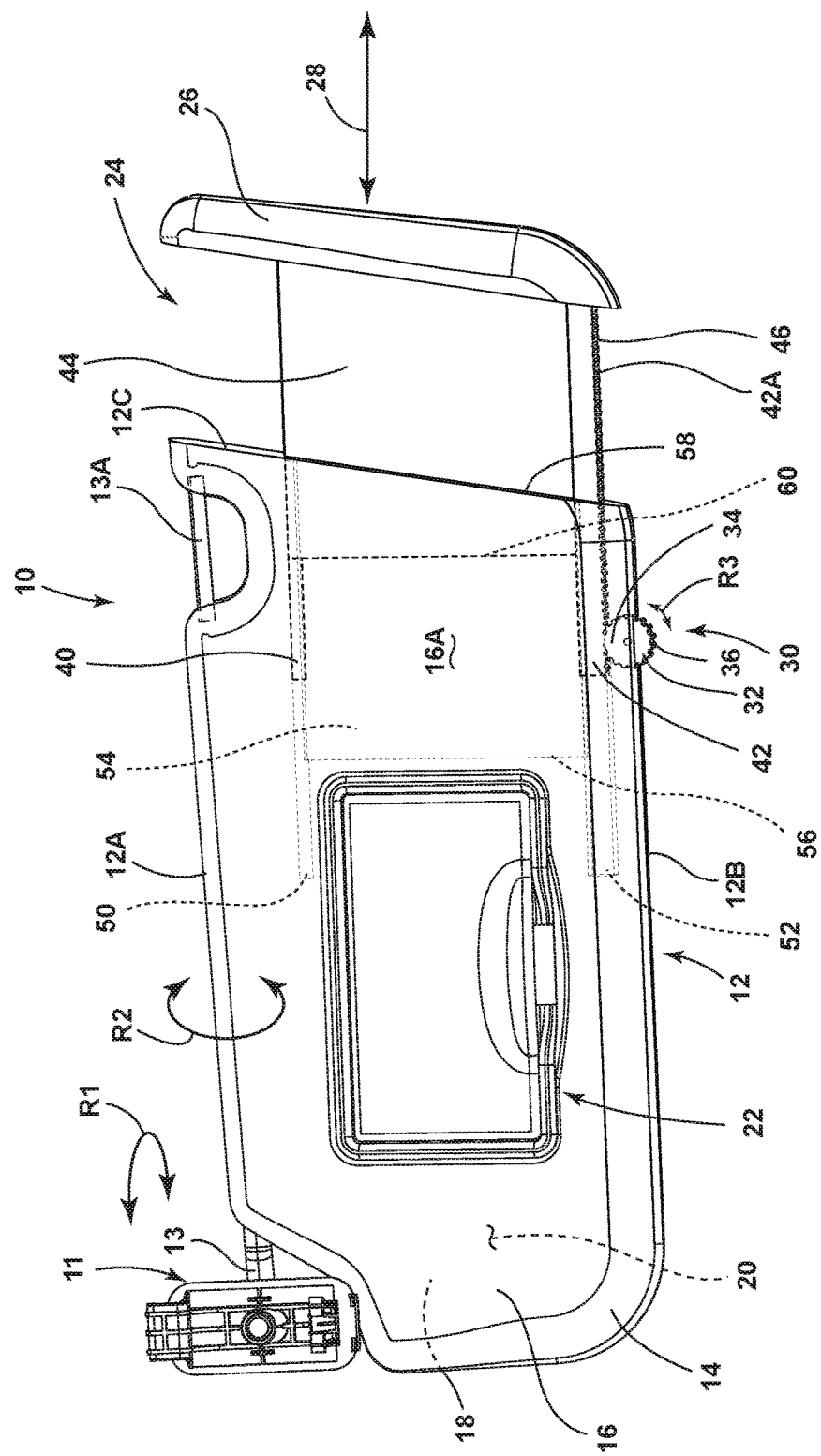
FIG. 2B is a top plan view of the vehicle visor of FIG. 2A with the blade in an extended position.

Referring now to FIG. 2B, the blade 24 is shown in the extended position relative to the visor body 12. With the blade 24 extended outwardly from the outer edge 12C of the visor body 12, the body portion 44 of the blade 24 provides for increased light blockage for incoming light into the vehicle cabin. As further shown in phantom in FIG. 2B, the inner cavity 20 of the visor body 12 includes first and second channels 50, 52 which are configured to slideably to receive the first and second rails 40, 42 of the blade 24. As specifically shown in FIG. 2B, the first channel 50 is disposed near the upper portion 12A of the visor body 12, while the second channel 52 is spaced-apart from the first channel 50 and disposed near the lower portion 12B of the visor body 12. The first and second channels 50, 52 may be referred to herein as upper and lower channels that are spaced-apart and interconnected by a slot 54 which is configured to slideably receive the body portion 44 of the blade 24 between the extended and retracted positions. Thus, the first and second rails 40, 42 and the body portion 44 of the blade 24 are configured to be received in the first and second channels 50, 52 and the interconnecting slot 54 disposed therebetween, respectively, such that the blade 24 can have the first and second rails 40, 42 and the body portion 44 concealed within the inner cavity 20 of the visor body 12 when the blade 24 is in the retracted position, as shown in FIG. 1. As further shown in FIG. 2B, the slot 54 includes an end wall 56 and an open front portion 58 that is spaced-apart from the end wall 56. In use, the blade 24 enters the inner cavity 20 of the visor body 12 via the open front portion 58 of the slot 54. The body portion 44 of the blade 24 includes an inner edge 60 which may abut the end wall 56 of the slot 54 when the blade 24 is in the fully retracted position as a stop feature. Further, the handle portion 26 is configured to abut the outer edge 12C and open front portion 58 of the visor body 12 when the blade 24 is in the fully retracted position. Thus, in the embodiment shown in FIG. 2B, it is contemplated that a user may have engaged the handle portion 26 of the blade 24 to move the blade 24 from the retracted position, shown in FIG. 1, to the extended position, shown in FIG. 2B. Further, it is also contemplated that a user may engage the adjustment knob 30 to rotate the lower portion 32 of the adjustment knob 30 towards the left to further rotate the upper concealed engagement portion 34 of the adjustment knob 30 towards the right while engaging the toothed track 46 of the blade 24. The gearing engagement between the toothed track 46 and the toothed outer perimeter 36 of the adjustment knob 30 allows for a user to incrementally adjust the position of the blade 24 to move the blade 24 from the retracted position to the extended position. When using the adjustment knob 30, it is contemplated that a user need only use a single finger to rotate the adjustment knob 30 as exposed from the lower portion 12B of the visor body 12. In this way, the present concept provides for fine adjustment of the blade 24 using a discrete adjustment mechanism in the adjustment knob 30 that requires only a single finger of a vehicle occupant for adjustment, as opposed to an entire hand of a vehicle occupant grasping the handle portion 26 of the blade 24.

Figure 3:
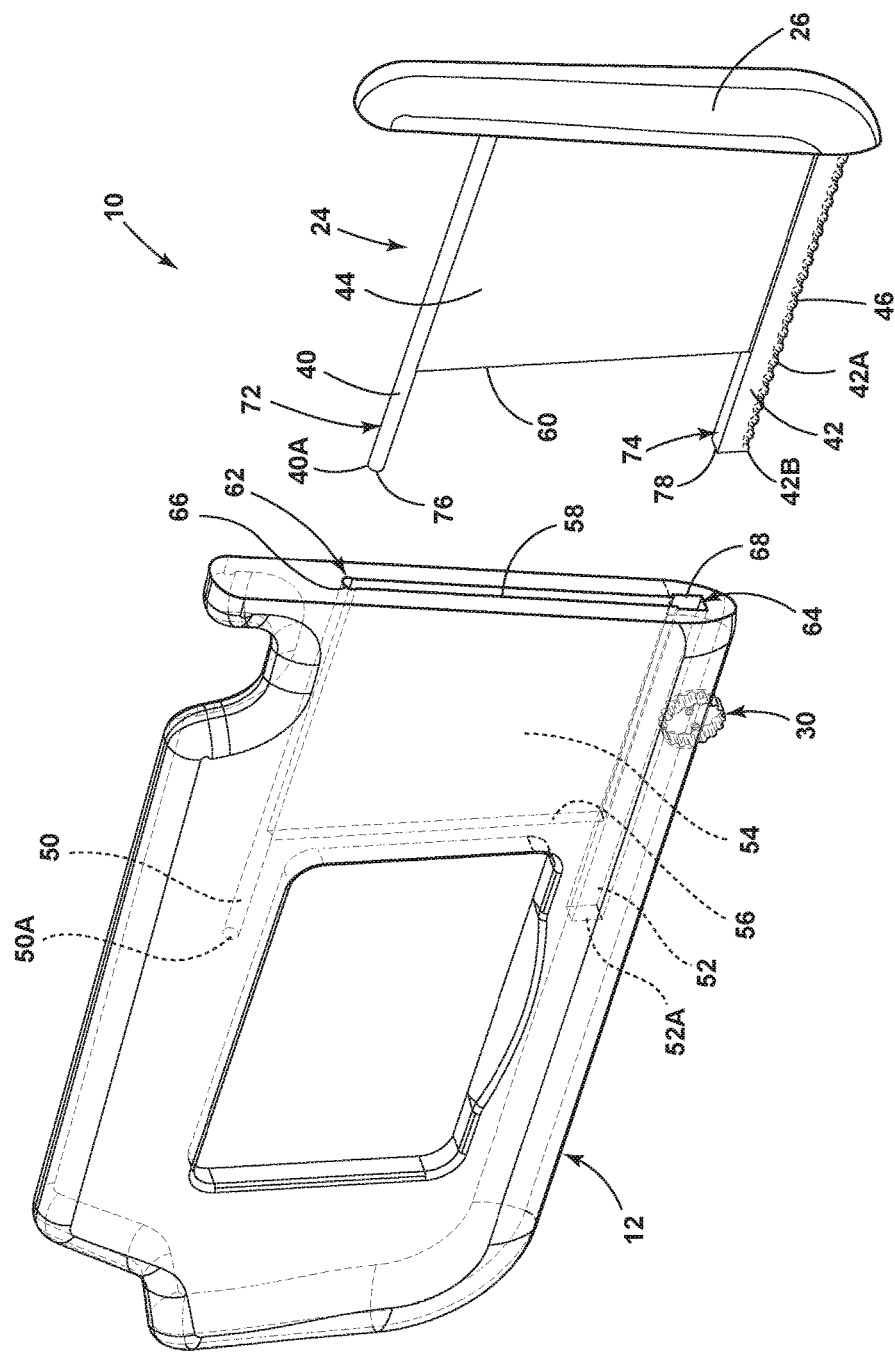
FIG. 3 is a top perspective view of the vehicle visor of FIG. 1 with the blade exploded away therefrom.

Referring now to FIG. 3, the blade 24 is shown exploded away from the visor body 12, such that the open front portion 58 of the slot 54 is shown. With the blade 24 fully removed from the visor body 12, distal ends 50A, 52A of the first and second channels 50, 52, respectively, are revealed. As shown in FIG. 3, the distal ends 50A, 52A extend inwardly into the inner cavity 20 of the visor body 12 beyond the end wall 56 of the slot 54. Similarly, the first and second rails 40, 42 of the blade 24 include inwardly extending distal ends 40A, 42B, respectively, which inwardly extend beyond the inner edge 60 of the body portion 44 of the blade 24. The inwardly extending distal ends 40A, 42B of the first and second rails 40, 42 may also abut the distal ends 50A, 52A of the first and second channels 50, 52, when the blade 24 is in the retracted position as a stop feature for the blade 24.

As further shown in FIG. 3, the first channel 50 includes a first cross-sectional configuration 62 while the second channel 52 includes a second cross-sectional configuration 64 that is different from the first cross-sectional configuration 62 of the first channel 50. The first cross-sectional configuration 62 of the first channel 50 includes a rounded outer perimeter 66. The second cross-sectional configuration 64 of the second channel 52 includes a non-round outer perimeter 68. As used herein, the term "non-round" is meant to exemplify a cross-sectional configuration having angled edges, such as the rectangle-shaped cross-sectional configuration 64 shown in FIG. 3 with the rectangular-shaped outer perimeter 68. Similarly, the first rail 40 includes a first cross-sectional configuration 72 having a rounded outer perimeter 76. In this way, the first cross-sectional configuration 72 of the first rail 40 is contemplated to be received in the first channel 50 at the first cross-sectional configuration 62 thereof. The first cross-sectional configuration 72 of the first rail 40 is contemplated to be slightly smaller in diameter as compared to the first cross-sectional configuration 62 of the first channel 50, such that the first rail 40 can be slideably received within the first channel 50. Similarly, the second rail 42 includes a second cross-sectional configuration 74 having a non-round outer perimeter 78 that is contemplated to be smaller in diameter than the second cross-sectional configuration 64 of the second channel 52. In this way, the second rail 42 is configured to be slideably received within the second channel 52 of the visor body 12. The first and second rails 40, 42 are contemplated to be appropriately sized, such that they are closely received within the cross-sectional configurations 62, 64 of the first and second channels 50, 52 in assembly. In this way, the engagement of the rails 40, 42 with the channels 50, 52, respectively, provides for guided movement of the blade 24 between the extended and retracted positions. The cross-sectional configurations 72, 74 of the first and second rails 40, 42 are further described below with reference to FIG. 6.

Figure 5:
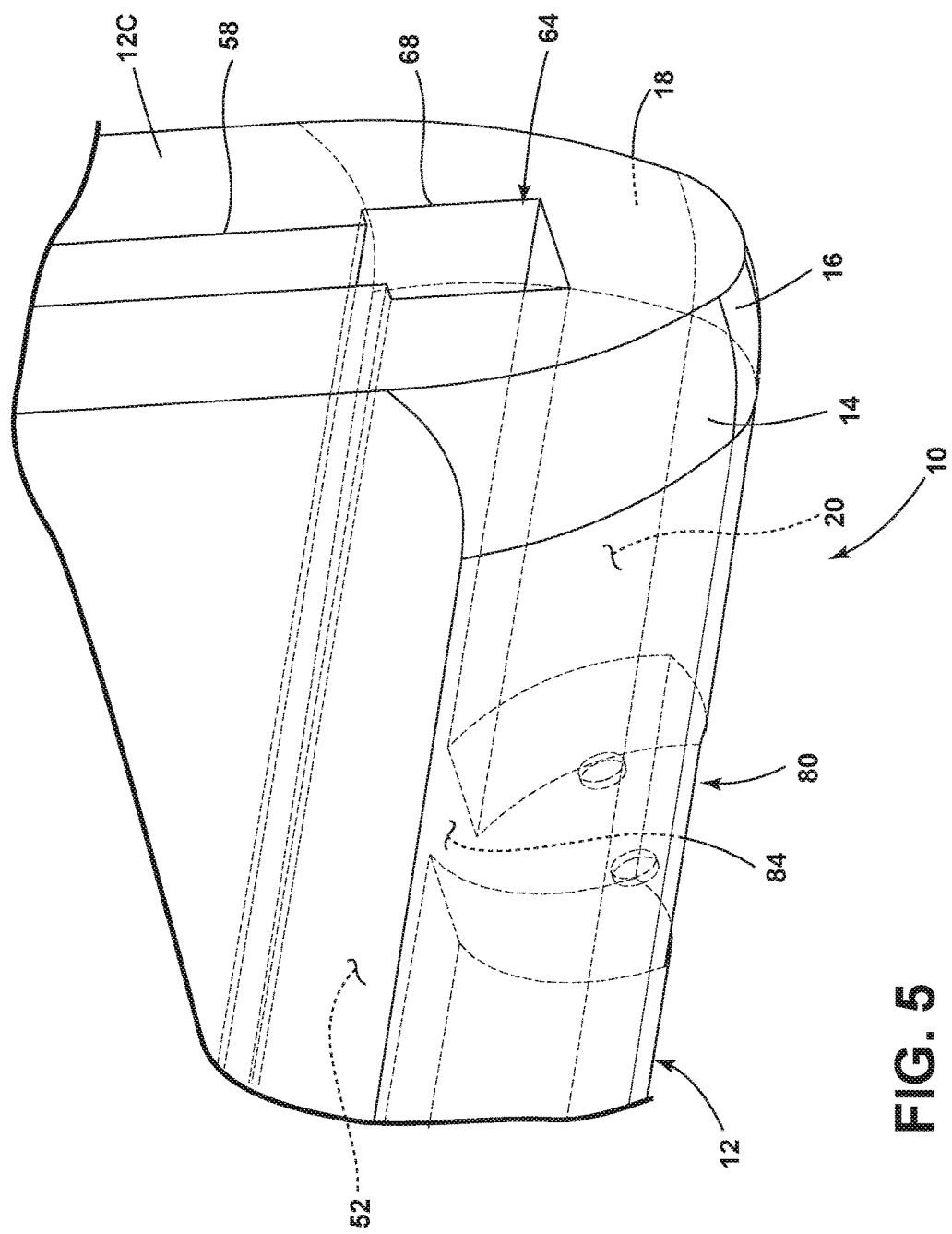
FIG. 5 is a partial top perspective view of the vehicle visor of FIG. 4 with the adjustment knob removed therefrom.

Referring now to FIG. 4, the adjustment knob 30 is shown disposed within a mounting aperture 80 disposed in the outer frame 14. The adjustment knob 30 is coupled to inner and outer panels 16, 18 at mounting apertures 82A, 82B disposed on opposite sides of the adjustment knob 30 at a central portion thereof. The mounting aperture 80 disposed in the outer frame 14 of the visor body 12 opens into the second channel 52 from an underside thereof via an access aperture 84. Thus, the access aperture 84 provides an opening into the second channel 52 for the toothed outer perimeter 36 of the adjustment knob 30 to extend into the second channel 52 for engagement with the toothed track 46 disposed on the underside 42A of the second rail 42, as shown in FIGS. 2A and 2B. Thus, the adjustment knob 30 is rotatably coupled to the inner and outer panels 16, 18 of the visor body 12 for rotation therein, such that the upper engagement portion 34 of the adjustment knob 30 extends into and rotates within the second channel 52 of the visor body 12. In this way, the geared engagement of the adjustment knob 30 and the toothed track 46 of the second rail 42 is concealed within the inner cavity 20 of the visor body 12. The mounting aperture 80 in which the adjustment knob 30 is rotatably mounted is also shown in FIG. 5, wherein the access aperture 84 is shown interconnecting the mounting aperture 80 and the second channel 52 of the visor body 12.

Figure 6:
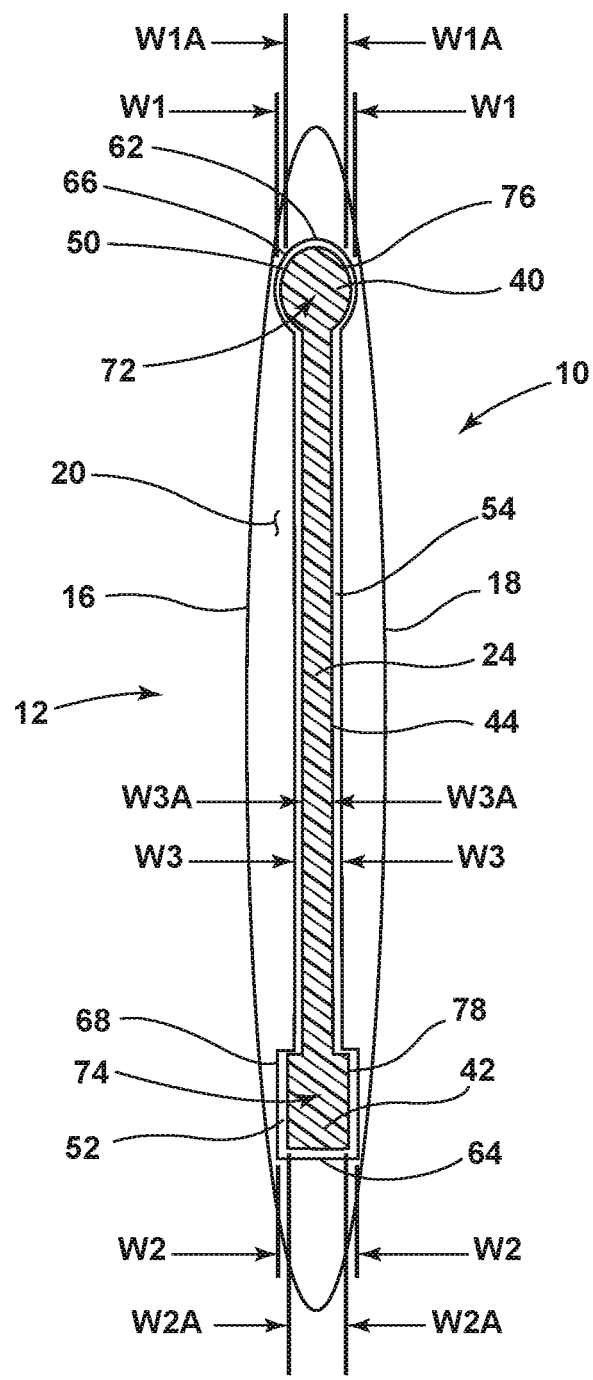
FIG. 6 is a cross-sectional view of the vehicle visor of FIG. 2A taken at line V1.

Referring now to FIG. 6, the cross-sectional view of the visor of FIG. 2B is shown with the blade 24 received in the inner cavity 20 of the visor body 12. In FIG. 6, the first cross-sectional configuration 62 of the first channel 50 is shown with the rounded outer perimeter 66. The rounded outer perimeter 66 includes a width W1 which is greater than the width W1A of the rounded outer perimeter 76 of the first rail 40. The first rail 40 is also shown with the rounded first cross-sectional configuration 72, such that the first rail 40 is closely received within the first channel 50. Similarly, the second cross-sectional configuration 74 of the second rail 42 is shown with the non-round outer perimeter 78 in a rectangular shape having a width W2A that is slightly less than the width W2 of the second cross-sectional configuration 64 of the second channel 52 having the non-round outer perimeter 68. In this way, the second rail 42 is closely received within the second channel 52. Finally, the body portion 44 of the blade 24 is shown closely received within the slot 54 disposed between and interconnecting the first channel 50 and the second channel 52. The body portion 44 of the blade 24 includes a width W3A that is less than the width W3 of the slot 54, such that the body portion 44 is closely received within the slot 54 disposed within the inner cavity 20 of the visor body 12. Thus, the overall configuration of the first and second channels 50, 52 and the interconnecting slot 54 disposed therebetween provides for a guided recess in which the specific portions of the blade 24 are closely received to allow for consistent movement of the blade 24 between the extended and retracted positions. This guided movement helps the blade 24 to move freely between the extended and retracted positions without binding, as little play is allowed for between the first and second rails 40, 42 and channels 50, 52, as well as the body portion 44 of the blade 24 and the slot 54.

As further shown in FIG. 6, the recess within the visor body 12 includes an hour-glass shape, wherein the width W1 of the rounded outer perimeter 66 of the first channel 50, and the width W2 of the non-round outer perimeter 68 of the second channel 52 are both greater than the width W3 of the interconnecting slot 54. Similarly, the blade 24 includes an hour-glass shape as well, wherein the width W1A of the rounded outer perimeter 76 of the first rail 40, and the width W2A of the non-round outer perimeter 78 of the second rail 42 are both greater than the width W3A of the interconnecting body portion 44. Thus, the outer surfaces of the body portion 44 are inset from the rounded outer perimeter 76 of the first rail 40 and the non-round outer perimeter 78 of the second rail 42. With outer perimeters of the rails 40, 42 and channels 50, 52 being different from one another, the blade 24 includes a variety of surfaces that act as guiding mechanisms against various twisting forces. Further, assembly of the blade 24 into the visor body 12 is directional, such that the toothed track 46 of the blade 24 will align for proper engagement with the adjustment knob 30 by the mechanical configuration of the rails 40, 42 and channels 50, 52.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly, or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle visor, comprising:
   a visor body having an inner cavity with first and second channels disposed therein;
   a blade slideably mounted to the first and second channels between extended and retracted positions; and
   an adjustment knob having a toothed outer perimeter that gearingly engages a toothed track disposed on the blade within the inner cavity, and an exposed portion disposed outside of the inner cavity.

2. The vehicle visor of claim 1, wherein the blade includes first and second rails slideably received in the first and second channels of the visor body, respectively.

3. The vehicle visor of claim 2, wherein the toothed track is disposed on an underside of the second rail.

4. The vehicle visor of claim 1, wherein the second channel includes an access aperture disposed therethrough, and further wherein the toothed outer perimeter of the adjustment knob extends through the access aperture to engage the toothed track of the blade.

5. The vehicle visor of claim 4, wherein the visor body includes an outer frame having inner and outer panels, and further wherein the adjustment knob is rotatably coupled to the inner and outer panels of the outer frame in a mounting aperture that opens into the second channel of the visor body through the access aperture.

6. The vehicle visor of claim 1, wherein the first and second channels are spaced-apart, and further wherein the visor body includes a slot disposed between and interconnecting the first and second channels, the slot including an open front portion spaced-apart from an end wall.

7. The vehicle visor of claim 6, wherein the blade includes first and second rails and a body portion disposed therebetween, and further wherein the first and second rails are slideably received in the first and second channels of the visor body, respectively, and the body portion of the blade is slideably received in the slot of the visor body.

8. The vehicle visor of claim 7, wherein the body portion of the blade includes an inner edge that abuts the end wall of the slot when the blade is in the retracted position.

9. The vehicle visor of claim 8, wherein the body portion of the blade further includes a handle portion disposed on an opposite end of the blade relative to the inner edge, wherein the handle portion abuts the open front portion of the slot of the visor body when the blade is in the retracted position.

10. A vehicle visor, comprising:
a visor body having first and second channels disposed therein, wherein the first and second channels include first and second cross-sectional configurations, respectively, wherein the first cross-sectional configuration is different than the second cross-sectional configuration;
a blade having first and second rails with a body portion disposed therebetween, wherein the first and second rails include first and second cross-sectional configurations, respectively, wherein the first cross-sectional configuration of the first rail is different than the second cross-sectional configuration of the second rail; and
wherein the first rail of the blade is slideably received within the first channel of the visor body, and further wherein the second rail of the blade is slideably received within the second channel of the visor body, such that the blade is operable between extended and retracted positions relative to the visor body.

11. The vehicle visor of claim 10, wherein the first cross-sectional configuration of the first channel includes a rounded outer perimeter, and further wherein the first cross-sectional configuration of the first rail includes a rounded outer perimeter.

12. The vehicle visor of claim 11, wherein the second cross-sectional configuration includes a non-round outer perimeter, and further wherein the second cross-sectional configuration of the second rail includes a non-round outer perimeter.

13. The vehicle visor of claim 10, including:
a toothed track disposed on the blade; and
an adjustment knob rotatably coupled to the visor body and having a toothed outer perimeter that gearingly engages the toothed track of the blade.

14. The vehicle visor of claim 10, wherein the first and second channels are spaced-apart, and further wherein the visor body includes a slot disposed between and interconnecting the first and second channels, the slot including an open front portion spaced-apart from an end wall.

15. The vehicle visor of claim 14, wherein the first and second channels of the visor body extend inwardly into the visor body beyond the end wall of the slot, and further wherein the first and second rails extend inwardly beyond an inner edge of the body portion of the blade.

16. A vehicle visor, comprising:
a visor body having first and second channels disposed therein, wherein the second channel includes an access aperture disposed therethrough;
a blade slideably mounted to the first and second channels at first and second rails thereof; and
an adjustment knob rotatably mounted to the visor body and having a toothed outer perimeter gearingly engaged with a toothed track disposed on the blade through the access aperture of the second channel.

17. The vehicle visor of claim 16, wherein the visor body includes inner and outer panels spaced-apart from one another to define an inner cavity of the visor body.

18. The vehicle visor of claim 17, wherein the adjustment knob engages the toothed track within the inner cavity of the visor body.

19. The vehicle visor of claim 18, wherein the adjustment knob is positioned on the visor body, such that a portion of the adjustment knob extends outwardly from the visor body.

20. The vehicle visor of claim 16, wherein the first and second channels include first and second cross-sectional configurations, respectively, wherein the first cross-sectional configuration is different than the second cross-sectional configuration, and further wherein the first and second rails of the blade include first and second cross-sectional configurations, respectively, wherein the first cross-sectional configuration of the first rail is different than the second cross-sectional configuration of the second rail.

* * * * *